(12) United States Patent
Barron

(10) Patent No.: US 7,126,310 B1
(45) Date of Patent: Oct. 24, 2006

(54) APPARATUS AND METHOD FOR BALANCED CHARGING OF A MULTIPLE-CELL BATTERY PACK

(75) Inventor: Christopher Barron, North Andover, MA (US)

(73) Assignee: Abiomed, Inc., Danvers, MA (US)

( * ) Notice: Subject to any disclaimer, the term of this patent is extended or adjusted under 35 U.S.C. 154(b) by 738 days.

(21) Appl. No.: 09/840,011

(22) Filed: Apr. 20, 2001

(51) Int. Cl.
*H02J 7/00* (2006.01)

(52) U.S. Cl. ...................... 320/108; 320/116

(58) Field of Classification Search ............... 320/108, 320/164, 116, 107, 118, 132, 120, 122, 136, 320/121, 162; 607/60, 32, 33
See application file for complete search history.

(56) References Cited

U.S. PATENT DOCUMENTS

| | | | |
|---|---|---|---|
| 4,082,097 A * | 4/1978 | Mann et al. ................ | 607/33 |
| 4,256,116 A | 3/1981 | Meretsky et al. ........... | 128/421 |
| 4,323,075 A | 4/1982 | Langer ....................... | 128/419 |
| 4,371,827 A | 2/1983 | Mullersman et al. ........ | 320/48 |
| 4,948,683 A | 8/1990 | Picozzi et al. .............. | 429/90 |
| 4,949,028 A | 8/1990 | Brune ......................... | 320/6 |
| 4,968,567 A | 11/1990 | Schisselbauer .............. | 429/90 |
| 5,017,856 A | 5/1991 | Johnson, Jr. ................ | 320/2 |
| 5,173,652 A | 12/1992 | Henkel ....................... | 320/2 |
| 5,352,968 A | 10/1994 | Reni et al. ................... | 320/35 |
| 5,489,835 A | 2/1996 | Stephens et al. ............ | 320/15 |
| 5,592,069 A | 1/1997 | Dias et al. .................. | 320/30 |
| 5,608,307 A | 3/1997 | Garrett et al. .............. | 320/39 |
| 5,661,393 A | 8/1997 | Sengupta .................... | 320/5 |
| 5,666,040 A * | 9/1997 | Bourbeau .................... | 320/118 |
| 5,675,233 A | 10/1997 | Kaneko et al. .............. | 320/15 |
| 5,690,693 A | 11/1997 | Wang et al. ................ | 607/61 |
| 5,713,939 A * | 2/1998 | Nedungadi et al. .......... | 607/33 |
| 5,751,217 A | 5/1998 | Kchaeo et al. .............. | 340/636 |
| 5,773,978 A | 6/1998 | Becker ....................... | 324/430 |
| 5,900,716 A | 5/1999 | Collar et al. ................ | 320/118 |
| 5,969,508 A | 10/1999 | Patino et al. ............... | 320/153 |
| 5,982,144 A | 11/1999 | Johnson et al. ............. | 320/112 |
| 5,994,878 A * | 11/1999 | Ostergaard et al. ......... | 320/132 |

(Continued)

FOREIGN PATENT DOCUMENTS

EP          0466496 A3     1/1992

(Continued)

OTHER PUBLICATIONS

W.F. Bentley, Cell Balancing Considerations for Lithium-Ion Battery Systems; Benchmarq Microelectronics, Inc., 17919 Waterview Parkway, Dallas, Tx 75252; 0-7803-3631-3/97 pp. 223-226.

*Primary Examiner*—Donald Sparks
*Assistant Examiner*—Lawrence Luk
(74) *Attorney, Agent, or Firm*—Cesari and McKenna, LLP; William A. Loginov

(57) ABSTRACT

An apparatus and method for charging a multiple-cell battery pack provides a balanced charge to each cell in a series by providing a cell charge monitor/regulator for (1) monitoring the charge (potential, for example) of each cell and, when a state is attained, defining a maximum cell charge, and (2) shunting further charge current to a next cell in the series via a shunt resistor that bridges the cell, and thereby bypasses further charging thereof, while directing shunted charge current to one or more next cells in the series as needed. Each of the cells is thereby charged to its fullest potential while the overall charging procedure is not unduly lengthened. The battery pack can be implanted as part of a life-saving system.

11 Claims, 8 Drawing Sheets

U.S. PATENT DOCUMENTS

| | | | |
|---|---|---|---|
| 5,998,967 A * | 12/1999 | Umeki et al. | 320/122 |
| 5,998,969 A | 12/1999 | Tsuji et al. | 320/132 |
| 5,998,973 A | 12/1999 | Tsai | 320/135 |
| 6,043,628 A | 3/2000 | Perelle et al. | 320/119 |
| 6,067,474 A | 5/2000 | Schulman et al. | 607/57 |
| 6,070,103 A * | 5/2000 | Ogden | 607/60 |
| 6,107,779 A | 8/2000 | Hara et al. | 320/132 |
| 6,121,751 A | 9/2000 | Merritt | 320/116 |
| 6,146,778 A | 11/2000 | Rouillard et al. | 429/7 |
| 6,149,683 A | 11/2000 | Lancisi et al. | 623/3 |
| 6,194,867 B1 | 2/2001 | Cummings et al. | 320/119 |
| 6,211,650 B1 | 4/2001 | Mumaw et al. | 320/122 |
| 6,227,204 B1 | 5/2001 | Baumann et al. | 128/899 |
| 6,268,710 B1 * | 7/2001 | Koga | 320/116 |
| 6,271,645 B1 | 8/2001 | Schneider et al. | 320/118 |
| 6,271,646 B1 | 8/2001 | Evers et al. | 320/122 |
| 6,275,004 B1 | 8/2001 | Tamai et al. | 320/118 |

FOREIGN PATENT DOCUMENTS

EP 0762593 A3 3/1997

* cited by examiner

APPARATUS AND METHOD FOR BALANCED CHARGING OF A MULTIPLE-CELL BATTERY PACK

BACKGROUND OF THE INVENTION

1. Field of the Invention

This invention relates to rechargeable battery packs having a plurality of series-connected cells, and more particularly to battery packs adapted for implantation in a human body and an apparatus and method for charging such battery packs.

2. Background Information

Rechargeable battery packs are a packaged assembly of a plurality of interconnected cells or "batteries" that are typically joined together to generate a desired overall voltage potential and current for powering a desired device or system. The term "battery" is sometimes used to describe a multiple-cell arrangement, and may often be used interchangeably. However, an extremely wide variety of modern electronic devices are powered by "batteries" that are configured as multiple-cell packs with particular voltage and current-handling capabilities tailored to the respective device. A large range of sizes and types of battery packs are produced to power these devices. Batteries typically employ a combination of electrolytic members and or electrolytes that undergo chemical/ionic transfer reactions to produce electric current. During current discharge, the components of rechargeable battery packs undergo a series of complex chemical reactions in a particular "direction," with concomitant change in the makeup of the electrolytes. Conversely, recharging, which uses an external current source to force current back into the battery pack, causes the direction of the internal electrochemical reaction to reverse, thereby returning the electrolytes to their original charged state.

Types of rechargeable battery packs in common use today include lead-acid, nickel-cadmium (NiCd), nickel-metal hydride (NiMH)—and the increasingly more-common lithium ion type. Each of these battery types is generally characterized by a multiplicity of individual cells, each containing the basic electrode/electrolyte combination that produces a discrete voltage potential thereacross. The opposing electrodes of a given number of cells are connected together in series so that the additive effects of the individual cell potentials are combined to produce the overall desired voltage potential for the battery pack.

One disadvantage associated with multiple-cell battery packs, including lithium ion type, is that the cells are not exactly identical in performance and charging characteristics. For example, within a given charge duration, one cell may reach a higher potential than an adjacent cell. A common charging technique is to regulate the application of charge current so that the charging current is cut off when the highest cell reaches its potential. However, this form of regulation may leave the other cells in the battery pack undercharged. This reduces overall battery capacity and may shorten pack life.

Various techniques have been employed to attempt to balance the potential in each cell. This may involve the use of a somewhat inaccurate mechanism for roughly balancing cell-to-cell potential between respective cells—or where a more accurate balance is desired, the use of fairly complex and expensive monitoring circuit, that increases the cost of the battery, may be required.

Multiple-cell lithium ion battery packs have become a common standard power source for portable electronics, and are desirable for their low-weight, small size, high power output and long life. Many common types are commercially available in the 9 to 14-volt output range, having up to four series cells each delivering approximately 4.2 volts. The advantageous characteristics of lithium ion type batteries render them particularly suitable for critical medical devices such as cardiac implants and monitors. However, where such battery packs are to be employed in the extremely demanding medical environment, reliability, quick charge capability and long life take on even greater importance. This is especially true where batteries may require high output (24–30 volts DC) and are directly implanted into the human body to service an implantable, life-saving device such as a pacemaker, cardiac assist device or artificial heart or other heart-treatment device.

Accordingly, it is an object of this invention to provide an apparatus and method for charging a multiple-cell battery pack that ensures all cells are charged to peak potential, thereby maximizing power output and life. The apparatus and method should enable a large number of high-output cells to be efficiently charged, with no undesirable delay in the charging process. The battery pack should enhance overall reliability in critical applications such as in conjunction with life-saving and/or implantable devices.

SUMMARY OF THE INVENTION

This invention overcomes the disadvantages of the prior art by providing an apparatus and method for charging a multiple-cell battery pack (or "battery") that provides a balanced charge to each cell in a series by shunting charge current from a cell that is fully charged to one or more next cells in the series to thereby ensure that each cell is charged to a predetermined maximum potential without unduly delaying the charging process or significantly wasting power.

According to a preferred embodiment the apparatus and method for cell-balancing provides a monitor/regulator circuit operatively connected with each cell that (1) monitors the charge (measuring voltage potential across the respective cell, for example) of each cell and, when a predefined maximum cell charge is attained, and (2) shunts further charge current to a next cell in the series via a shunt resistor that bridges the cell, and thereby prevents further charging thereof, as shunted current is carried along the series line to other cells that require further charge.

In one embodiment, each cell-balancing circuit includes a pair of leads each connected on opposite sides of a respective cell. Adjacent cells in the series share a common lead of the pair of leads, such that each lead (except the first and last) are connected to both the anode of one cell and the cathode of the next cell. A reference voltage circuit is connected across the leads and a voltage divider, defined by a pair of appropriately rated resistors is separately connected across the leads. The output of the reference voltage source and the output of the voltage divider (connected between the resistor pair) are each connected to respective inputs of a comparator. The comparator output is connected to a solid state switching device (such as a PNP transistor or power field effect transistor (FET)) that is in line with a shunt resistor. The shunt resistor/switching device also bridges the respective cell, being operatively connected to the pair of leads. When the comparator senses a relative voltage from the cell (as output by the divider) in excess of the fixed reference voltage, it drives the switching device to close its circuit, causing charge current to flow through the shunt resistor. This relieves charging from the cell, and "shunts" the charging current on to the next cell in the series.

A sensing circuit is connected across a sense resistor at the end of the cell series between the battery ground (battery terminal), and the charging system ground, in line with the charging unit. The sensing circuit provides feedback from the sense resistor to regulate the maximum current output rate of the charging circuit to the battery pack.

According to a preferred embodiment, the battery pack is implemented as part of an implantable life-saving device that can include a thoracic unit, such as an artificial (replacement) heart, heart-assist device pacemaker, or other mechanical organ/organ-assist unit, a controller and an implanted transcutaneous energy transfer (TET) module adapted to receive electrical energy from an external TET module connected to a power source. The controller can include charger circuitry that directs charging current to the battery pack when required, and that utilizes the battery packs power when current from the TET system is unavailable or insufficient—typically in the role of a battery-backup power system when the implanted TET module receives no energy, or insufficient energy, to power the life-saving system.

BRIEF DESCRIPTION OF THE DRAWINGS

The foregoing and other objects and advantages of the invention will become clearer with reference to the following detailed description as illustrated by the drawings, in which.

DETAILED DESCRIPTION OF AN ILLUSTRATIVE EMBODIMENT

Figure 1:
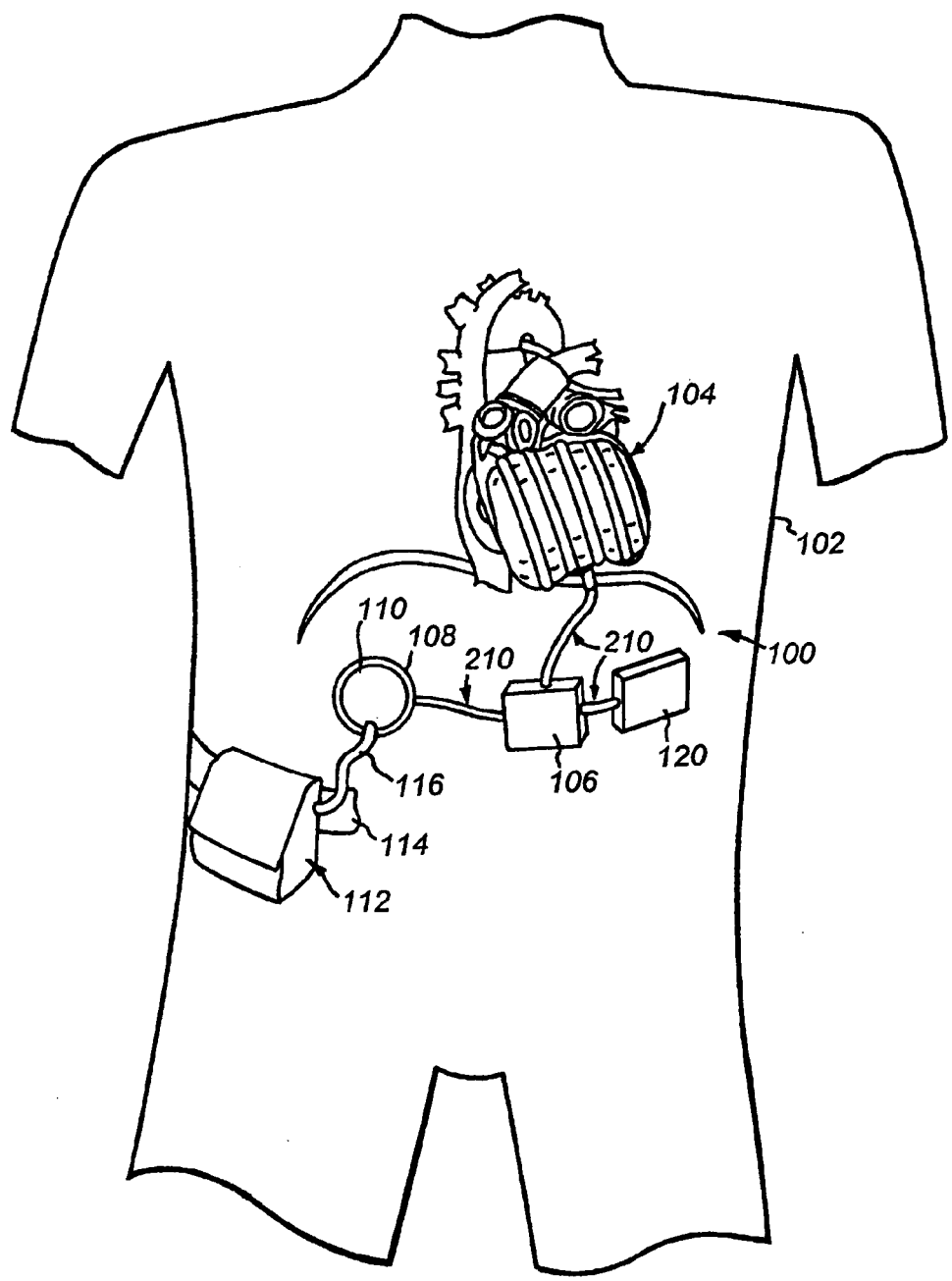
FIG. 1 is a somewhat schematic exposed view of a human body having a life-saving implantable device powered by a system that includes a rechargeable battery pack according to this invention.

FIG. 1 shows an exemplary life-saving system implanted in the thoracic region of a human body 102. In this example, the life-saving system is directed toward an artificial heart 104 such as the AbioCor™ replacement heart system developed by Abiomed, Inc. of Danvers, Mass. The system requires electric power to maintain pumping mechanisms that emulate the blood-circulatory action of the original heart and control functions that regulate pumping and other critical system parameters.

Figure 2:
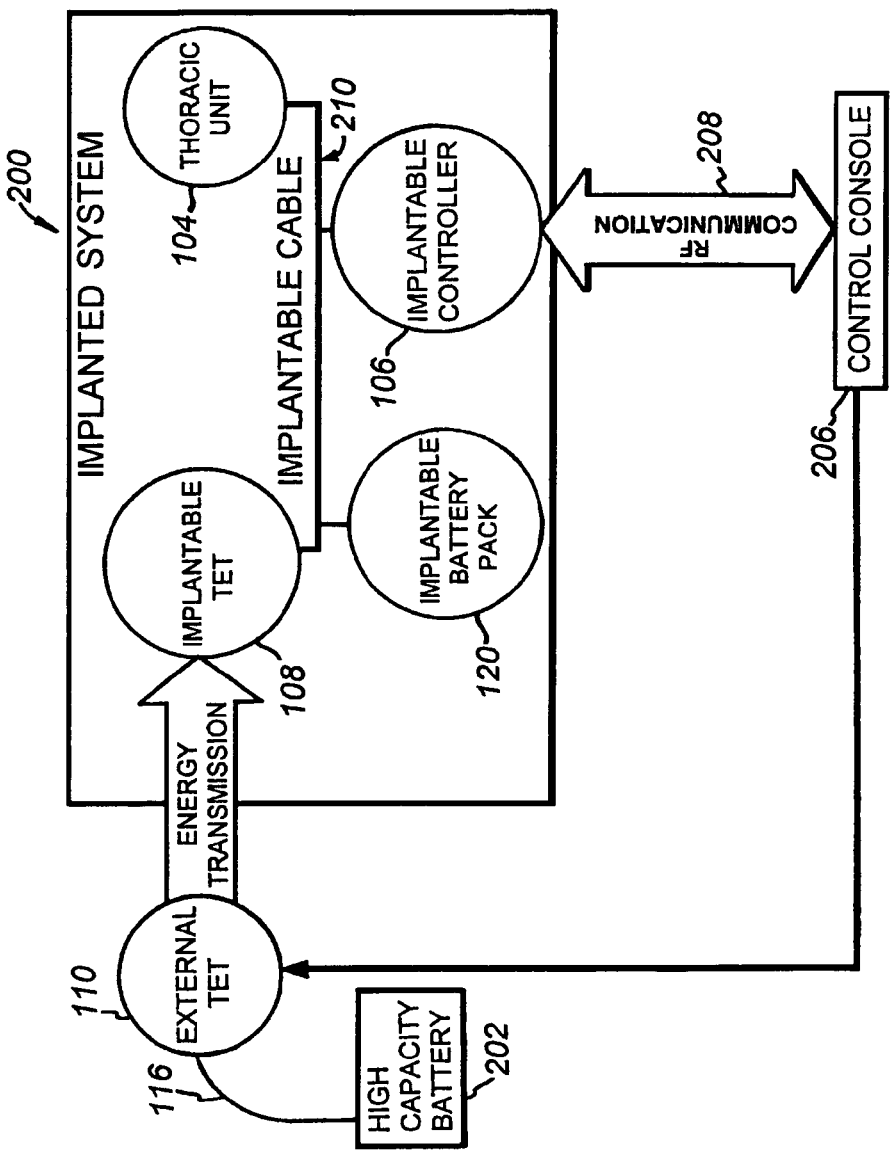
FIG. 2 is a block diagram of the system of FIG. 1 detailing the components thereof.

With reference also to the system-level block diagram 200 of FIG. 2, electric power and control information is delivered to the heart (the "thoracic unit") through an implanted controller 106. In turn, the controller receives basic electric power input through an implanted transcutaneous energy transmission (TET) module 108. The implanted TET 108 resides beneath the skin of the body so as to eliminate any leads or wires exiting the skin. This reduces the possibility of infection and generally enhances patient well-being. The implanted TET 108 receives energy through the skin via electromagnetic induction from an external TET module 110. Using the energy transferred through the skin layer, the implanted TET module derives electricity for powering the implanted system 100.

The external TET 110 receives power from a high-capacity battery unit (or other fixed power source) 202 (FIG. 2). The high-capacity battery unit 202 can be mounted in a pouch 112 that is worn by the patient using, for example a belt 114, and is connected to the external TET by a cable 116. The pouch can also include various control circuitry and a radio frequency (RF) transceiver for communicating with the controller 106. Similarly, an external control and monitoring console 206 can be tied to the controller 106 using RF communication 208. A number of additional internal and external control units and monitors can also be employed. Note that all implanted components are sufficiently rugged to ensure long life under typical loads to which a body is subjected. In addition all components are sealed fully and constructed using biocompatible materials.

The implanted thoracic unit 104, controller 106 and TET 108 are operatively connected via an implantable cable 210 that carries power and control information through-out the system 100. Also residing on the cable 210 is an implanted battery pack (battery) 120. Like the controller 106, the battery pack 210 is operatively positioned within the body, in a convenient location where it will not interfere with normal functions, and preferable, will not interfere in patient comfort. Conversely the implantable TET 108 is preferably placed in a location where it will remain in its implanted position over time, such as in a muscular area over the rib cage, etc. so that it remains positioned properly to receive energy from the external TET 110. The implanted/internal battery pack is designed to act as a backup in the event the TET is off-line or temporarily disconnected and also when the high-capacity battery is depleted or disconnected. The implantable battery pack is constructed and sealed in a manner that renders it biocompatible. In other words, it includes a sealed casing (see FIG. 1) that ensures no leakage of battery electrolytes and/or chemicals into the body, and likewise, no infiltration of biological fluids or tissues into the pack. The battery pack's normal charge capacity is sufficient to enable operation of the thoracic unit at anticipated levels for a predetermined time period (for example, one hour) without external power.

According to one embodiment of the invention, the controller 106 includes, and houses in a sealed controller casing (see FIG. 1), charging circuitry (described further below) that recharges, and maintains the charge of the battery pack 120 when not in use by the system based upon charging current provided by the TET 108. The controller 106 can include switching circuitry for bringing the pack on-line the moment it is needed.

Having described an exemplary life-saving system in which an implanted battery can be employed, the particular features of a battery pack for use in such environments and associated charging components according to an embodiment of this invention are now described in further detail.

Figure 3:
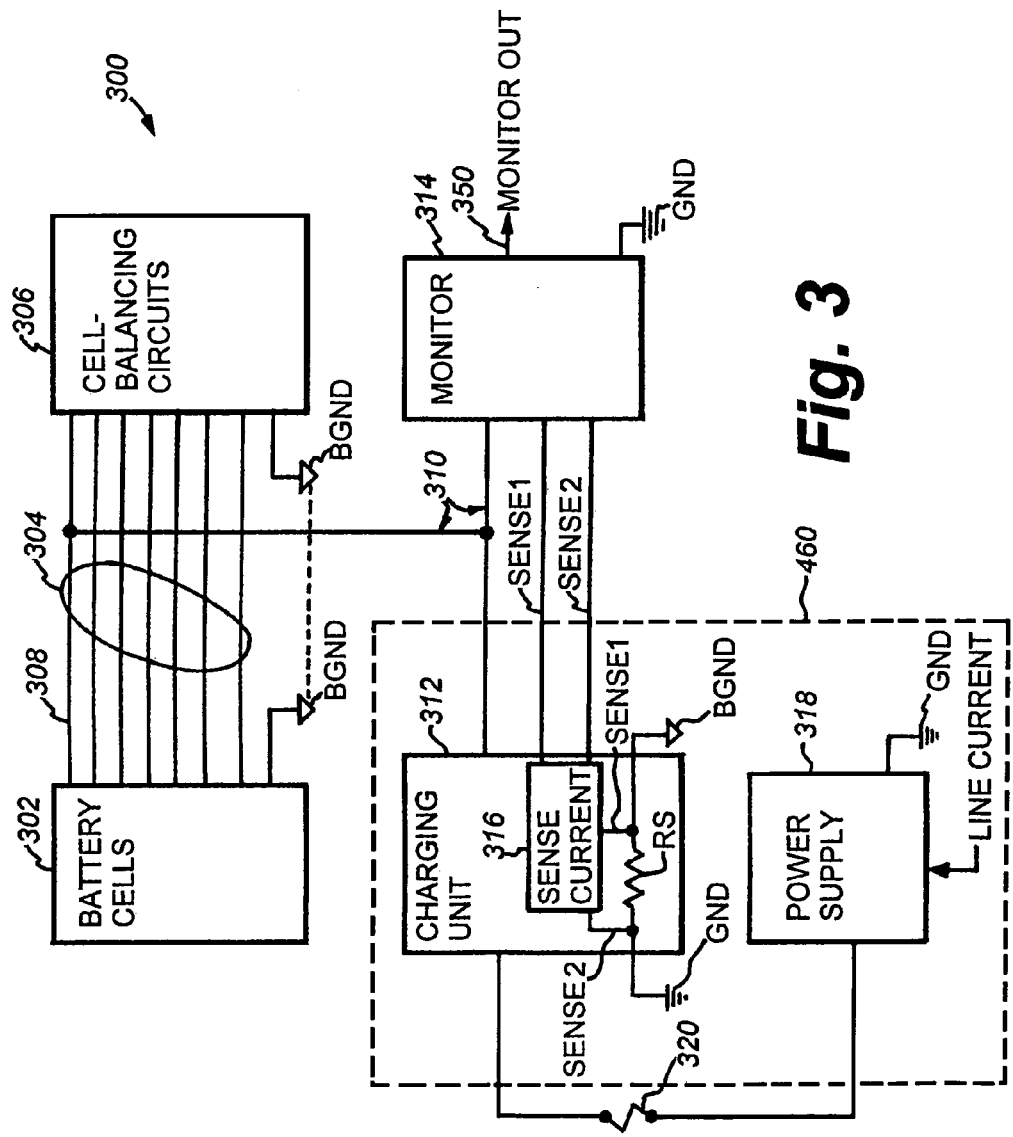
FIG. 3 is a block diagram of a multiple-cell battery pack, charging circuit and cell-balancing circuit including a charge monitor/regulator according to a preferred embodiment of this invention.

FIG. 3 shows a schematic block diagram of a multiple-cell battery pack (often termed simply a "battery") and charging system 300 according to a preferred embodiment of this invention. The battery pack 302 comprises a series of interconnected lithium ion cells according to a preferred embodiment. As noted above a variety of other cell-types can be employed, including nickel metal hydride (NiMH) and Nickel Cadmium (NiCd). The cells are operatively connected by respective connections 304 to cell-balancing circuits 306. A battery ground BGND, typically the negative battery pack end terminal, is provided for the cells and the cell-balancing circuits. The positive lead 308 is connected by a branch 310 to a charging unit 312 and charge monitor 314. The charging unit provides current to charge the battery pack while the monitor monitors a variety of battery pack state values including temperature, charge level and the like. The monitor may be optional, and can be used to control various equipment or charging unit functions based upon battery pack state or can be used to alarm the use when problems with the battery pack or system arise. The charging unit includes a sense circuit 316 that monitors inputs SENSE1 and SENSE2 from a sense resistor RS (shown in phantom) located in-line with the charging unit. This sense circuit regulates the maximum charging current of the battery based upon feedback from the inputs SENSE1 and SENSE2. The function and structure of the charging unit, sense circuit and monitor are further described below.

A power supply 318 is also connected via a fuse/circuit breaker 320 to the charging unit 312. The power supply receives line current and converts it to DC charging current of a desired voltage. As described with reference to the system of FIGS. 1 and 2, the implanted TET 108 can be used to transmit charging current based upon the controller 106, which can contain the charging unit in accordance with the above example. As will be described further below the battery pack of this embodiment is charged using current at a 25 to 30-volt potential. The charging unit 312, monitor 314 and power supply 318 are each connected via a system ground GND. GND and other common connections can be shared between components using the implantable cable 210.

In accordance with an embodiment of this invention, the cells 302 can be provided in the casing of the battery pack 120 as shown in FIG. 1. The charging unit 312, monitor 314, power supply and cell-balancing circuits 306 can all be housed in the casing of the controller 106 (FIG. 1). The cells 302 are connected with these components via the implantable cable 304, which is constructed to include the connections 304 as well as battery ground and positive terminals, and system ground connections. The position of system components can be varied, and some of the components, such as the cell-balancing circuits can be located within the battery pack casing. Likewise any of the components of FIG. 3 can be located outside the body according to an alternate embodiment, with appropriate connections made to the remaining implanted components.

Figure 4:
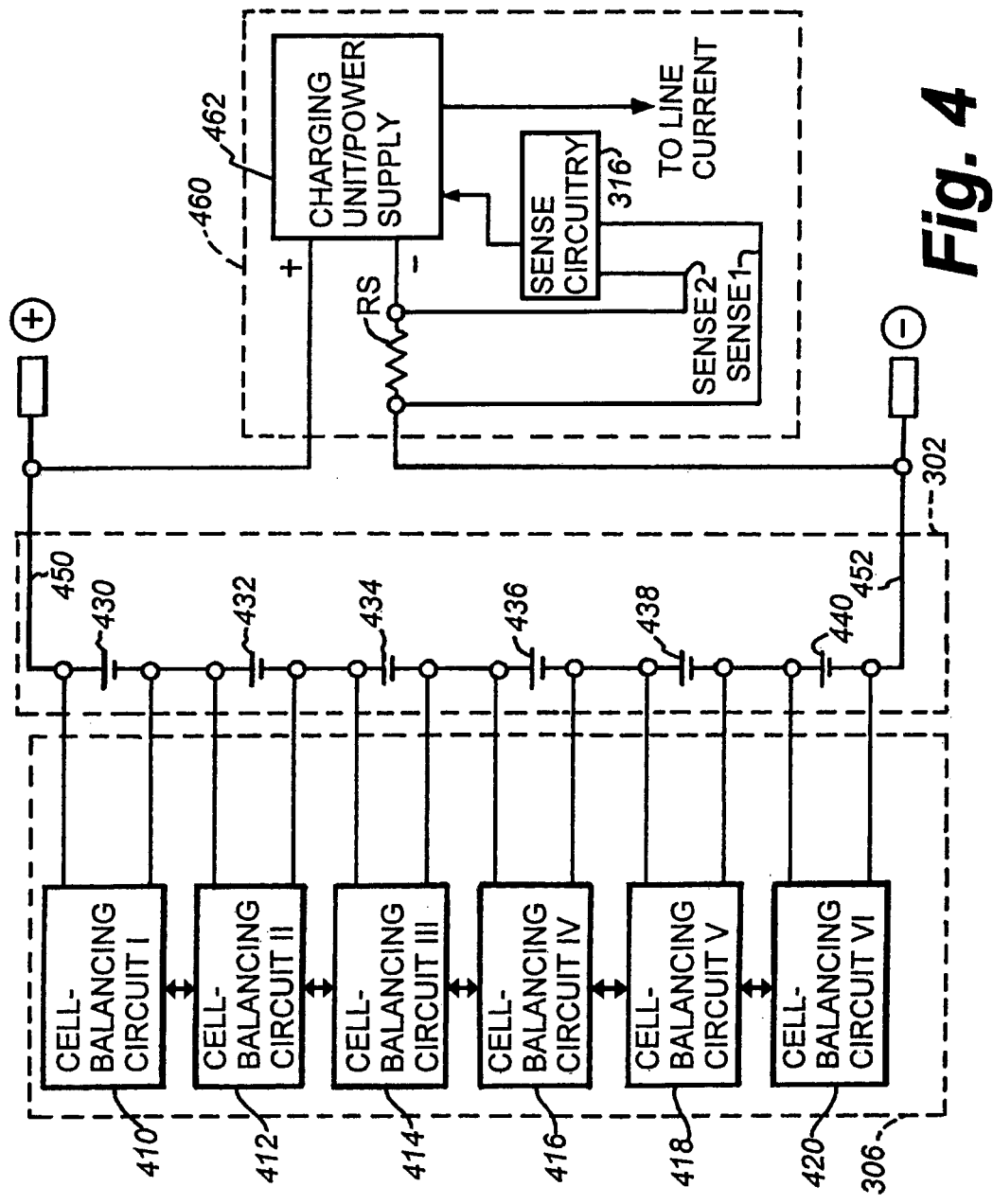
FIG. 4 is a more detailed block diagram of the multiple-cell battery pack and associated cell-balancing circuit.

The overall charging circuit is shown in greater detail in FIG. 4. The cell-balancing circuit group 306 includes a plurality of individual cell-balancing circuits 410, 412, 414, 416, 418 and 420. Each cell-balancing circuit is connected across a respective cell 430, 432, 434, 436, 438 and 440. The cells are themselves interconnected in series between a positive terminal lead 450 and a negative terminal lead (battery ground) 452. The charging assembly 460, consisting of the combined charging unit and the power supply 462, sense circuit 316 and associated in-line sense resistor RS, is connected to the positive and negative leads 450, 452 during the charge cycle. The sense circuit 316 senses when a predetermined potential is present across the sense resistor RS. This provides positive feedback the charging unit/power supply 462 to regulate the charge current. The operating levels for the sense circuit and resistor RS depend upon the type of battery pack, its size and the parameters of the charging unit. These values are described below for the preferred embodiment. Based upon the operation of the cell-balancing circuits of this invention, the individual cells should each be substantially fully charged when the overall maximum charge for the battery pack is attained.

Figure 5:
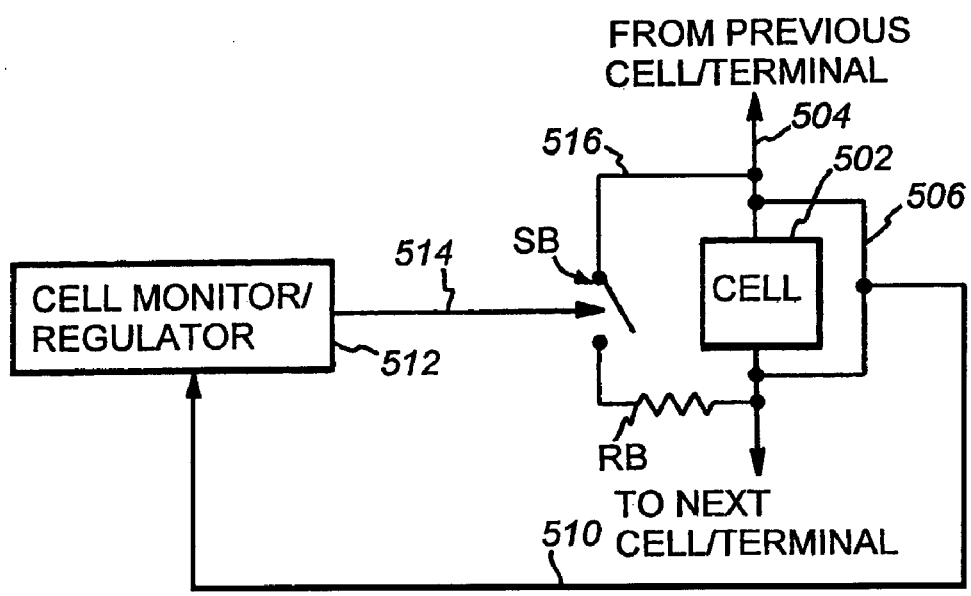
FIG. 5 is a schematic diagram of an exemplary cell and cell-balancing circuit including a charge monitor/regulator operatively connected thereto.

FIG. 5 shows the generalized cell-balancing circuit for a discrete cell of the battery pack. The cell 502 is located along a line 504 of series-interconnected cells. Monitor leads 506 that connect across the cell are used to return a cell charge-state value (typically cell potential) over a return path 510 to a generalized cell charge monitor/regulator 512. The cell monitor/regulator is a circuit of any configuration that has the capability of responding to a given reading across the cell, and to selectively activate an output 514 to a bypass switch SB. The bypass switch can be any acceptable switch or gate—typically a PNP transistor. A shunting/bypass bridge 516 extends around the cell, including the switch SB. Also on the shunting bridge is a bypass resistor RB that has a resistance value sufficient to enable the full charge current to travel preferably across the shunting bridge 516 when the switch SB is closed. In operation, when the cell state is below a predetermined maximum threshold charge, the switch is maintained in an open position, causing the charge current to pass through the cell, thereby charging it further. Each time the monitored state of the cell indicates a maximum charge potential, the cell monitor/regulator 512 responds by closing the switch SB to close the shunt, enabling charging current that is sourced on the series line 504 to effectively bypass the cell in favor of the shunt 516. The charging current is thereby shunted to the next cell in the series (or battery pack terminal where the last cell is shunted) from a previous cell (or battery pack terminal where the first cell is shunted). If and when the cell potential again drops below the maximum threshold value, the switch SB is then opened (disconnecting the shunt), and current flows preferably through the cell to effect charging thereof. In practice, the switch for each cell may open and close in a rapid succession of cycles as the cell potential rises to threshold, and then begins draining during shunt.

Figure 6:
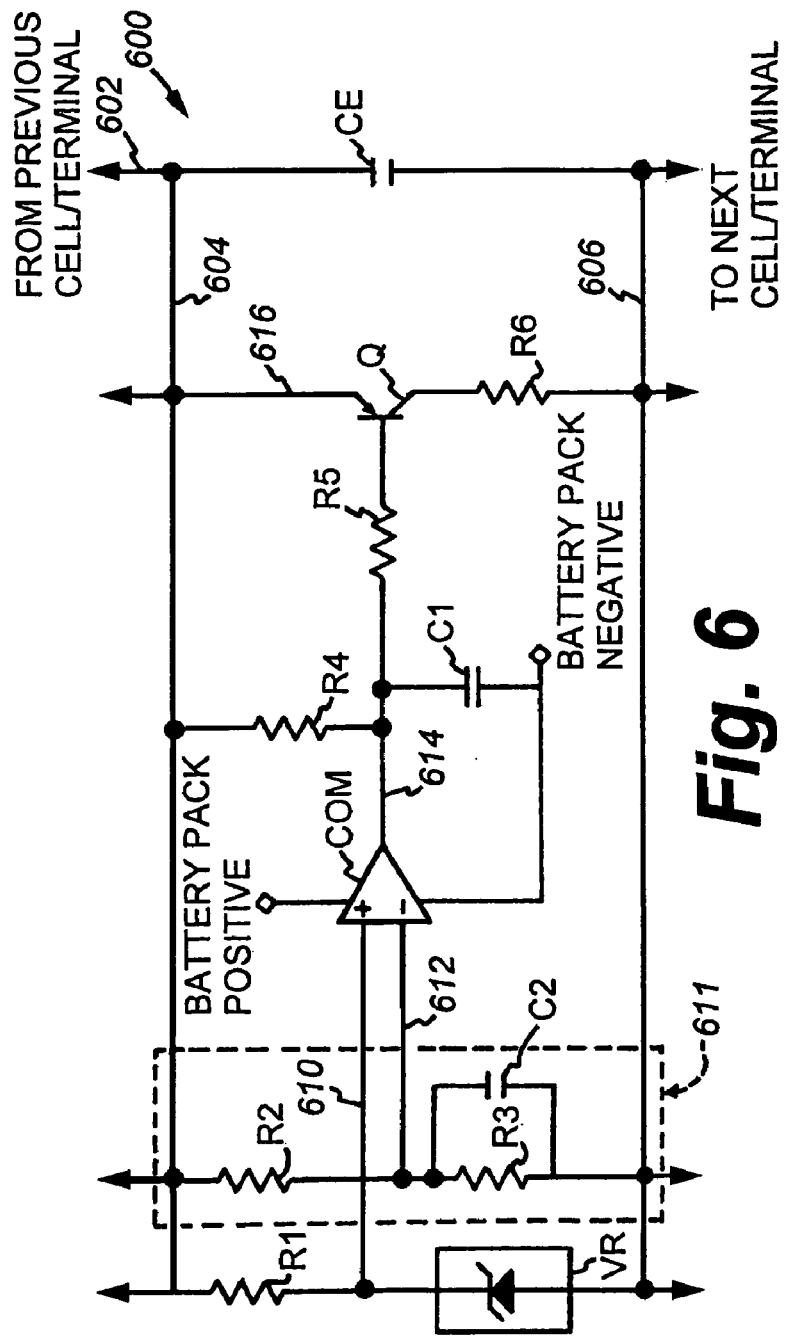
FIG. 6 is a more detailed schematic diagram of an exemplary cell and cell-balancing circuit according to a preferred embodiment.

An implementation of the cell-balancing circuit is shown in FIG. 6 according to a preferred embodiment. The circuit 600 is one of a plurality of circuits each disposed along the battery cell line. The depicted lead arrows extending from selected nodes of the circuit are leads to other like components in adjacent balancing circuits in the series (refer generally to the overall circuit in FIG. 7, described further below). Where the respective balancing circuit forms a top or bottom of the battery series, the respective top or bottom arrows are omitted, and only a positive or negative battery pack terminal is provided from the cell.

The balancing circuit 600 includes a cell CE located along the cell series line 602. A pair of leads 604 and 606 bridge the cell CE. A reference voltage circuit VR and an appropriately rated resistor R1 are connected between the leads 604 and 606. An output 610 is connected between the reference voltage VR and the resistor to provide a constant voltage of a predetermined level. A voltage divider 611 is also connected between the leads 604 and 606. The divider 611 is defined by resistors R2 and R3. Between the resistors is connected another output 612. The outputs 611 and 612 are each connected to inputs of a comparator COM. Note that the comparator is powered via the battery pack positive and battery pack negative/ground in this embodiment. A noise reduction capacitor C2 is provided across R3 in a preferred embodiment. The output 614 of the comparator COM is connected to a pull-up resistor R4. Note the output 614 is also connected with a noise reduction resistor C1. A further resistor R5 is in line with the output 614, which connects to the base of transistor Q.

The comparator is arranged so that when the variable output 612 of the voltage divider (depending upon the charge state of the cell) is greater than the fixed reference voltage on the output 610 (representing a cell voltage in excess of a maximum reference voltage), the comparator saturates the transistor into an "on" state to close the shunting bridge 616. Closing the switching device thus causes charging current to flow along the bridge 616 so as to effectively bypass the cell CE. Note that a bypass resistor R6 is included in the shunting bridge 616. As discussed above, the value for R6 is chosen to effectively shunt all charging current away from the cell CE.

The electrical values of the various electronic components of the cell-balancing circuit 600 are chosen based upon the underlying voltage of the cell CE, the maximum charge current and the relative voltages generated by the voltage divider arrangement and reference voltage. In a preferred embodiment, a high-output battery pack having six lithium ion cells is contemplated. The overall maximum charge for each battery cell is approximately 4.2 volts. The overall battery pack voltage at maximum charge equals approximately 24.6 volts. The bypass resistor R6 is therefore chosen so that approximately 170 mA of current can be passed across the shunting bridge 616, ensuring that a charge current in excess of 150 mA (approximately one-quarter of the maximum charge capacity) is fully shunted from the cell. The values of the resistors can be chosen as follows R1=24.9K Ohms; R2=324K Ohms; R3=499K Ohms; R4=100K Ohms; R5=2.80K Ohms (subject to variation as described below); R6=24 Ohms/1 watt handling power. Likewise the reference voltage of VR is set at 2.5 volts. The capacitors C1 and C2 can each equal 0.1 microFarad.

While the above-described cell-balancing circuit including a reference voltage source, a voltage divider and a comparator represents a preferred embodiment for monitoring the charge state of a cell and signaling transistor Q, a person of ordinary skill will recognize that a variety of known circuits can be employed for this purpose. By way of example, a diode having breakdown voltage at a predetermined level can be used as necessary with a voltage divider in a configuration where a desired voltage across the cell causes the diode to break down, and thereby allow current flow that can be used to signal the transistor Q to close.

Figure 7:
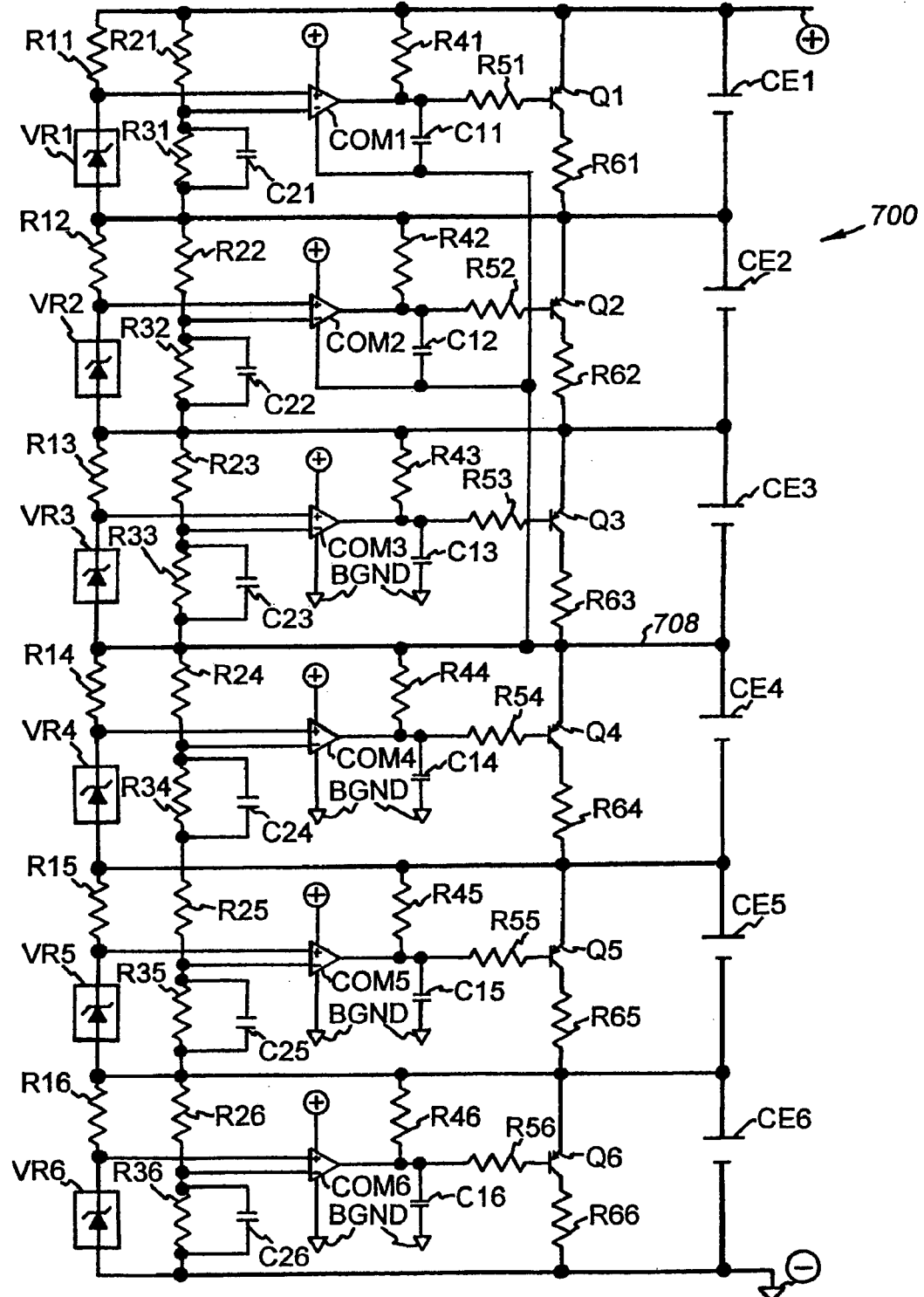
FIG. 7 is a more detailed schematic diagram of the exemplary multiple-cell battery pack and respective cell-balancing circuits therefor according to a preferred embodiment.

FIG. 7 details the overall structure 700 for the six-cell battery pack according to a preferred embodiment of this invention. The various components of the circuit are essentially analogous to those described for the exemplary circuit 600 of FIG. 6. As such, each resistor R1 of FIG. 6 is given the like designation R11–R16 in FIG. 7. Similarly, R2 corresponds to R21–R26; R3 to R31–R36; R4 to R41–R46; R5 to R51–R56; R6 to R61–R66; cell CE to CE1–CE6; reference voltage VR to VR1–VR6; comparator COM to COM1–COM6; capacitor C1 to C11–C16; C2 to C21–C26 and transistor Q to Q1–Q6. The values for R1, R2, R3, R4 and R6 are all unchanged. Likewise the values for C1 and C2 are all unchanged. Each component VR, in this embodiment comprises a part designated as LM4040AIM3-2.5, available generally from well-known vendors such as National Semiconductor Corporation of Santa Clara, Calif. Each transistor Q1–Q6 comprises a standard PNP solid state transistor, such as model FCX589. Alternatively another solid state switching device can be employed such as a power field effect transistor (FET). Because of packaging considerations, the comparators COM1 and COM2 are pair of LMC6772 model comparators available from National Semiconductor, while the comparators COM3–COM6 are each model LP339 comparators, also from National Semiconductor. The negative power connection for COM1 and COM2 are each operatively connected to the cell lead 708. The associated noise-reduction capacitor C11 and C12 are each connected between the respected output of the comparator COM1, COM2 and the lead. Conversely, comparators COM3–COM6 are each connected directly to the battery ground BGND, as well as the associated noise-reduction capacitor C13–C16. As noted above the values for the various resistors R5 differ based upon their location in the over-all circuit and the variation in models of comparator employed. In this embodiment, R51=2.8K Ohms; R52=1.74K Ohms; R53=3.83K Ohms; R54=2.80K Ohms; R55=1.74K Ohms and R56=698 Ohms. These values are chosen to provide appropriate switching potentials (saturation) to the respective transistors Q1–Q6.

It should be clear that the foregoing implementation of the circuit can be varied depending upon the performance of the components and the maximum charge capacity of the respective battery cells. In an alternate embodiment, other types of components, as well as different packaging arrangements can be employed to perform the same function of monitoring the cell state and selective shunting current away from the cell, and toward other cells in the battery pack. In this embodiment, the circuit components used are precision components accurate to within approximately plus-or-minus one percent from stated parameters.

Figure 8:
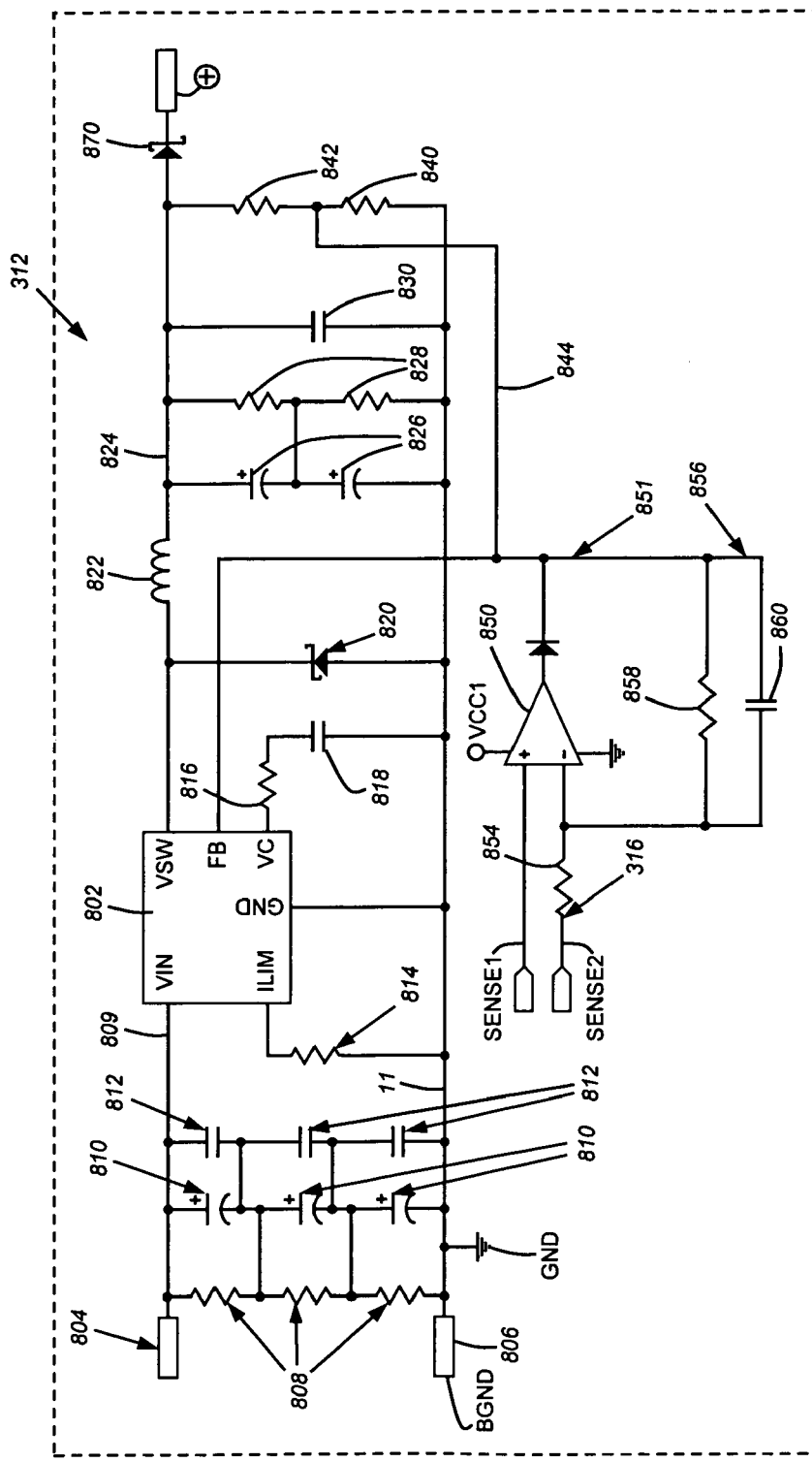
FIG. 8 is a schematic diagram of a charging circuit according to a preferred embodiment of this invention.

Referring to FIG. 8, a charging circuit according to a preferred embodiment is shown. The charging circuit is, in general, a commercially available device calibrated for the specific battery pack size (voltage) and charge rate. The primary component of the charging unit is the solid state regulator 802, which in this example is a model LT1076HVCR voltage regulator available from Linear Technology Corporation of Milpitas, Calif. The maximum regulated voltage input by this unit is approximately 65 volts. In the preferred embodiment, the maximum charge voltage is set at approximately 25.1 volts. As described above, the associated charge rate (current) is set to be one-quarter the maximum charge capacity.

Given a maximum charge capacity of the cells according to this embodiment of approximately 550 mA hours, the maximum charging unit output is set at 150 mA. By reducing the charge rate, the life of the battery pack may be increased. The charge rate can be altered in order to either reduce the charge cycle time or increase overall battery pack life. Input from the power supply is routed to the regulator through a fused voltage in-line 804 and a system ground 806/GND.

In accordance with the specifications of the exemplary regulator 802, the input voltage lead 809 (regulator input VIN) and ground lead 611 are bridged through a set of high-resistance 1 M-Ohm resistors 808 and 22-microFarad electrolytic capacitors 810. In addition, 0.1-microFarad capacitors 812 are provided, and each of the resistors and capacitors are separately bridged to each other as shown. A 3.42K-Ohm resistor 814 is tied between the ground and the regulator input ILIM that sets the maximum charge current as a backup to the sense circuit 316. In addition, the regulator input GND is also tied to the ground lead 611. The regulator input VC is tied through a 2.8K-Ohm resistor 816 and a capacitor 818 rated at 0.01-microFarad to ground. The output voltage VSW from the regulator is tied to ground through a diode bridge 820. A 100-microHenry/500-milliamp inductor 822 is located along the output 824 downstream of the diode bridge. Additional 22 microFarad capacitor 826 and 1 M-Ohm resistors 828 bridge the output 824 and ground. In addition, a 0.1-microFarad capacitor bridge 830 is also provided between the output 824 and ground. Between a pair of resistors 840 and 842, each tied between ground and the output 824, is a branch 844 from the sense circuit 316. The sense circuit 316 is also tied to the regulator input FB. The resistor 840 is a 2.26K-Ohm resistor. The resistor 842 is a 23.2K-Ohm resistor. The sense circuit 316 receives inputs from the sense resistor RS (see FIG. 4). The sense resistor RS (see FIGS. 3 and 4) is rated a 0.056-Ohm resistor. When this resistance is sensed across the sense inputs SENSE1 and SENSE2, the amplifier 850. A model LMC 6482AIM standard amplifier provides a corresponding gain value of 262.7 at the output 851. This reaches a sufficient level so as to provide to a charge shut-off signal to the regulator input FB. A 1.02KOhm resistor 854 is also provided on the input SENSE2. In addition the input SENSE2 bridges the amplifier through the parallel resistor and capacitor circuit 856 having a resistor 858 rated at 267KOhms and a capacitor 860 rated at 0.01-microFarad. The overall regulator output VSW on the output 824 is routed through a diode 870 to terminate at the battery pack positive terminal (+).

The particular charging circuit shown is exemplary only. Any acceptable implementation can be substituted according to this invention. It is generally desired that a charging circuit have the capability of limiting charge rate and shutting down when a predetermined maximum charge level or time is attained. In addition other parameters such as temperature can be taken into account by the charging unit circuitry.

In addition, as noted above a variety of standard monitoring circuits (see FIG. 3) can be operatively connected to the battery pack and the charging unit. Such circuits can receive inputs SENSE1 and SENSE2 from the sense resistor RS in order to better monitor the overall state of the battery pack. In addition, temperature and other probes can be fitted to the battery pack to ensure that it operates within desired parameters. Such parameters can be reported to a variety of devices using one or more output signals (MONITOR OUT 350 in FIG. 3).

It should be clear that a battery pack and recharging system in accordance with this invention enable a longer-life to be attained with reduced risk of failure. In an implanted application, this has the clear advantage of ensuring the enhanced safety of the patient as the pack is less likely to degrade prematurely and will be less likely to suffer destruction from over charging, under charging or uneven charging. In addition, the frequency and likelihood of uncomfortable surgical procedures to replace degraded battery packs is reduced.

The foregoing has been a detailed description of a preferred embodiment of the invention. Various modifications and additions can be made without departing from the spirit and scope thereof. For example, the placement of charging unit components, power supplies, cell-balancing circuits and battery cells within the overall system can be varied. In other words, the cell-balancing circuits can be located physically on the battery pack, or can be placed in association with the charging unit to be accessed when the battery pack and charging unit are operatively connected together. The power supply can be a separate component or incorporated in the charging unit package. Likewise, the monitor can be placed with the battery pack and/or cell-balancing circuits or with the charging unit or in a separate package. The structure of the circuit can be widely varied. In an alternate embodiment, the circuit can be formed as single integrated circuit package such as an application specific integrated circuit (ASIC) that resides on the battery pack or charging unit. It is expressly contemplated that the various circuit components herein (such as the cell monitor/regulator) can also be implemented in whole or in part as digital circuits, with appropriate analog-to-digital and digital-to-analog converters and interfaces where needed. In addition, the voltage ranges, charging rates and other parameters specified herein can be widely varied. It is expressly contemplated that the principles herein can also be applied to other types of battery packs/battery cells and battery packs having a mixture of cell types, sizes and configurations including those that include nickel-cadmium, nickel metal hydride, and the like. Finally, while the battery pack described herein is associated with a particular type of implanted life-saving device (a replacement heart), the battery pack described herein can be used in conjunction with a variety of life-saving devices including heart assist devices, pacemakers, internal monitors, etc. To this end, the location and configuration of the controller and charging components can be varied (for example, mounted externally). The battery pack can also be externally mounted rather than implanted, depending upon the application. And in an alternate embodiment, the battery can be applied to other non-medical applications for which a high quality, long-life rechargeable battery is desired. Accordingly, this description is meant to be taken only by way of example and not to otherwise limit the scope of the invention.

What is claimed is:

1. A method for balancing charge levels comprising:
   using a battery pack having a plurality of cells arranged in series;
   bridging around a first cell of the plurality of cells with a bypass resistor and a switch;
   monitoring a charge level of one of the cells based upon an input connected across the first cell, including comparing a relative voltage potential across the first cell with respect to a reference voltage potential and wherein the step of comparing includes providing cell monitor/regulator includes a voltage divider connected across the first cell and having an output connected to a first input of the comparator, and a reference voltage source that outputs the voltage potential to a second input of the comparator;
   closing the switch when the charge level of the first cell equals a maximum value so as to shunt charge current around the cell through the bypass resistor;
   connecting an output of the comparator to a lead of the switch, the switch closing a path through the bridge when the comparator measures a voltage at the second input greater than a voltage at the first input;
   saturating a transistor in response to an output of the comparator when the comparator measures a voltage at the second input greater than a voltage at the first input; and
   locating battery pack terminals at respective opposing ends of the series of the plurality of the cells, and connecting respective opposing leads of a charging circuit to the terminals at predetermined times so as to charge the plurality of cells.

2. The method a set forth in claim 1 further comprising connecting a sense resistor in line with one of the terminals, and measuring an overall voltage across the sense resistor and regulating a maximum current delivered to the battery pack by the charging circuit in response to a measured value the overall voltage.

3. The method as set forth in claim 1 wherein the cells comprise lithium ion-type cells.

4. The method as set forth in claim 1 wherein the cells comprise at least six cells.

5. The method as set forth in claim 4 wherein the cells comprise lithium ion type cells.

6. The method as set forth in claim 1 further comprising operatively connecting the cells to a life-saving system and powering the life-saving system with the cells.

7. The method as set forth in claim 6 further comprising implanting the cells in a body and providing an external power source that transmits charging current to the cells.

8. The method as set forth in claim 7 wherein the step of providing the external power source includes transmitting energy through a skin layer of the body using induction.

9. A method for balancing charge levels comprising:
   using a battery pack having a plurality of cells arranged in series;
   bridging around a first cell of the plurality of cells with a bypass resistor and a switch;
   monitoring a charge level of one of the cells based upon an input connected across the first cell, including comparing a relative voltage potential across the first cell with respect to a reference voltage potential and wherein the step of comparing includes providing cell monitor/regulator includes a voltage divider connected across the first cell and having an output connected to a first input of the comparator, and a reference voltage source that outputs the voltage potential to a second input of the comparator;
   closing the switch when the charge level of the first cell equals a maximum value so as to shunt charge current around the cell through the bypass resistor;
   connecting an output of the comparator to a lead of the switch, the switch closing a path through the bridge when the comparator measures a voltage at the second input greater than a voltage at the first input;
   saturating a transistor in response to an output of the comparator when the comparator measures a voltage at the second input greater than a voltage at the first input; and
   monitoring each of the cells based upon an input connected across each of the cells for measuring a charge of the each of the cells respectively, and providing a bridge around the each of the cells, the bridge including a respective bypass resistor and a respective switch and closing the respective switch when the charge of the each of the cells equals a maximum value so as to shunt charge current around the each of the cells through the respective bypass resistor.

10. A transcutaneous energy transmission (TET) system adapted for implantation in a body and for powering an implanted life-saving device comprising:
   an implanted TET module for receiving energy through the skin and transmitting electricity derived from the energy to a life-saving device; and
   an implanted rechargeable battery pack including a battery pack having a plurality of series-arranged cells, having a bridge connected around a first cell, including a bypass resistor in series with a switch, and a cell monitor/regulator having an input connected across the first cell for measuring a charge of the first cell, wherein the cell monitor/regulator closes the switch when a charge of the first cell equals a maximum value.

11. The TET system as set forth in claim 10 wherein the battery pack is adapted to be charged when the implanted TET module receives energy from an external TET transmitter and to discharge, so as to power the life-saving device when the implanted TET module receives one of either no energy or insufficient energy.

* * * * *